(12) United States Patent
Desorcy et al.

(10) Patent No.: US 10,512,225 B2
(45) Date of Patent: Dec. 24, 2019

(54) TREE SAP LINE CONNECTOR AND ASSEMBLY

(71) Applicant: ERATUBE INC., Saint-Hyacinthe (CA)

(72) Inventors: Raynald Desorcy, Saint-Hyacinthe (CA); Donald Lapierre, Saint-Ludger (CA); Yanick Dozois, La Présentation (CA)

(73) Assignee: ERATUBE INC., Saint-Hyacinthe, Quebec ( * ) Notice: Subject to any disclaimer, the term of this patent is extended or adjusted under 35 U.S.C. 154(b) by 776 days.

(21) Appl. No.: 15/074,474

(22) Filed: Mar. 18, 2016

(65) Prior Publication Data

US 2016/0270308 A1    Sep. 22, 2016

Related U.S. Application Data

(60) Provisional application No. 62/134,617, filed on Mar. 18, 2015.

(51) Int. Cl.
*A01G 23/14*    (2006.01)

(52) U.S. Cl.
CPC .................................. *A01G 23/14* (2013.01)

(58) Field of Classification Search
CPC ........ A01G 23/10; A01G 23/12; A01G 23/14; F16L 21/00; F16L 25/10; F16L 47/06; F16L 47/00; F16L 37/04; F16L 37/26
See application file for complete search history.

(56) References Cited

U.S. PATENT DOCUMENTS

| | | | | |
|---|---|---|---|---|
| 295,151 | A * | 3/1884 | Cummins | F16L 25/08 285/325 |
| 833,081 | A | 10/1906 | McVoy | |
| 2,944,369 | A | 7/1960 | Soule | |
| 3,046,698 | A | 7/1962 | Breen | |
| 3,057,115 | A | 10/1962 | Frank | |
| 3,156,069 | A * | 11/1964 | Lamb | A01G 23/14 47/51 |
| 3,260,539 | A * | 7/1966 | Herron | F16L 37/26 285/24 |
| 3,304,654 | A | 2/1967 | Reynolds | |
| 4,299,053 | A | 11/1981 | Foote | |
| 4,366,648 | A | 1/1983 | Morin | |
| 4,512,104 | A | 4/1985 | Lamb | |

(Continued)

FOREIGN PATENT DOCUMENTS

CA    1096637 A *    3/1981    ............. A01G 23/10

*Primary Examiner* — David Bochna
*Assistant Examiner* — James A Linford
(74) *Attorney, Agent, or Firm* — Norton Rose Fulbright Canada LLP

(57) ABSTRACT

A tree sap line connector having a fluid transfer body with interconnected walls defining a hollow inner chamber. The inner chamber is in fluid communication with a plurality of sap conduits, each of which extends from one of the walls. Each sap conduit is engageable with a sap collection line to convey sap to and from the inner chamber. At least one of the walls has a groove therein, which extends a depth into the wall and is accessible from an exterior of the fluid transfer body. The groove removably receives therein a connector piece of a sealing member. The sealing member is removably mounted to the line connector when the connector piece is received in the groove.

10 Claims, 8 Drawing Sheets

(56) References Cited

U.S. PATENT DOCUMENTS

| | | |
|---|---|---|
| 4,926,597 A | 5/1990 | Landry |
| 5,224,289 A * | 7/1993 | Buzzell .................. A01G 23/14 |
| | | 285/361 |
| 5,303,504 A | 4/1994 | Buzzell |
| 5,564,227 A | 10/1996 | Chabot |
| 6,438,895 B1 | 8/2002 | Fortier |
| D501,040 S | 1/2005 | Gieson |
| 8,677,682 B2 | 3/2014 | Cote |
| 2003/0047940 A1 | 3/2003 | Desorcy |
| 2011/0173880 A1 | 7/2011 | Perkins |
| 2011/0173881 A1 | 7/2011 | Perkins |

* cited by examiner

TREE SAP LINE CONNECTOR AND ASSEMBLY

CROSS-REFERENCE TO RELATED APPLICATIONS

This applications claims priority to U.S. provisional patent application No. 62/134,617 filed on Mar. 18, 2015, the entire contents of which are incorporated by reference herein.

TECHNICAL FIELD

The application relates generally to devices for collecting and conveying liquids and, more particularly, to a device for transferring sap received from a tree.

BACKGROUND OF THE ART

In northern climes, the sap from trees, such as maple trees, is harvested in the springtime and made into edible fluids and substances. In larger operations, many trees are tapped for their sap, and a network of tubes links each tap to a central sap-collecting location. A device such as a line tee links the tubes of the network to an individual tap in a tree. A sap-collection circuit is thus formed from each tap being linked to a corresponding line tee, and from multiple line tees being linked together to deliver sap to the central sap-collecting location. Some line tees have a plug, pin, or cap that is integral to that line tee, and which is used to seal a corresponding tap linked to that line tee at the end of the sap-collecting season.

At the end of the sap-collecting season, the interior of the tubes and taps of the sap-collection circuit are often cleaned to remove sap residue. One technique for cleaning the sap-collection circuit involves using a vacuum pump to create a central vacuum. An operator will remove a tap from the tree, and place a free end of the tap into a container of cleaning fluid. The cleaning fluid is then aspirated through the tap, through at least one line tee, and through the tubes back to the central vacuum, thereby cleaning one part of the sap-collection circuit. Once the tap is clean, the operator will seal the free end of the tap to keep it clean. The tap is sealed with the plug, pin or cap that is integral with the corresponding line tee for the duration of the off season. This is repeated for each tap.

It is sometimes necessary for an operator to change the plug, pin or cap used to seal a corresponding tap. Since the plug, pin or cap is integral to the line tee, changing the plug, pin or cap requires changing the line tee itself. Changing a line tee involves a significant amount of work because the tubes connecting the line tee to the other line tees of the sap-collection circuit and to the tap must be removed and re-attached to the new line tee. If the tubes cannot be removed, as often occurs, they must be cut from the line tee. New tubing must then be used to attach the new line tee to its neighbouring line tees, which requires carefully selecting the right length of new tubing. Significant delay and inconvenience results when this work is done for multiple line tees.

SUMMARY

In one aspect, there is provided a tree sap line connector, comprising: a fluid transfer body having interconnected walls defining a hollow inner chamber being in fluid communication with a plurality of sap conduits each extending from one of the walls, each sap conduit being engageable with a sap collection line to convey sap to and from the inner chamber, at least one of the walls being free of a sap conduit and having a groove therein, the groove extending a depth into said wall and being accessible from an exterior of the fluid transfer body to removably receive therein a connector piece of a sealing member, the sealing member being removably mounted to the line connector upon the connector piece being received in the groove.

In another aspect, there is provided a tree sap line connector assembly, comprising: at least one line connector comprising a fluid transfer body having interconnected walls defining a hollow inner chamber being in fluid communication with a plurality of sap conduits each extending from one of the walls, each sap conduit being engageable with a sap collection line to convey sap to and from the inner chamber, at least one of the walls being free of a sap conduit and having a groove therein, the groove extending a depth into said wall and being accessible from an exterior of the fluid transfer body; and at least one sealing member having a sealing body to seal a corresponding spout adapted to receive sap from a tree, the at least one sealing member having a connector piece being shaped complementary to the groove in the fluid transfer body, the connector piece being removably insertable into the groove to removably mount the at least one sealing member to the at least one line connector.

In yet another aspect, there is provided a method for connecting tree sap collection lines, comprising: attaching an end of one of the sap collection lines to a spout to be inserted into a tree, and attaching an opposite end of said sap collection line to a line connector having a hollow inner chamber to convey sap to and from the inner chamber; attaching at least another sap collection line to the line connector; and removably mounting part of a sealing member to the line connector, the sealing member being engageable with the spout to seal the spout.

DESCRIPTION OF THE DRAWINGS

Reference is now made to the accompanying figures in which.

DETAILED DESCRIPTION

Figure 1:
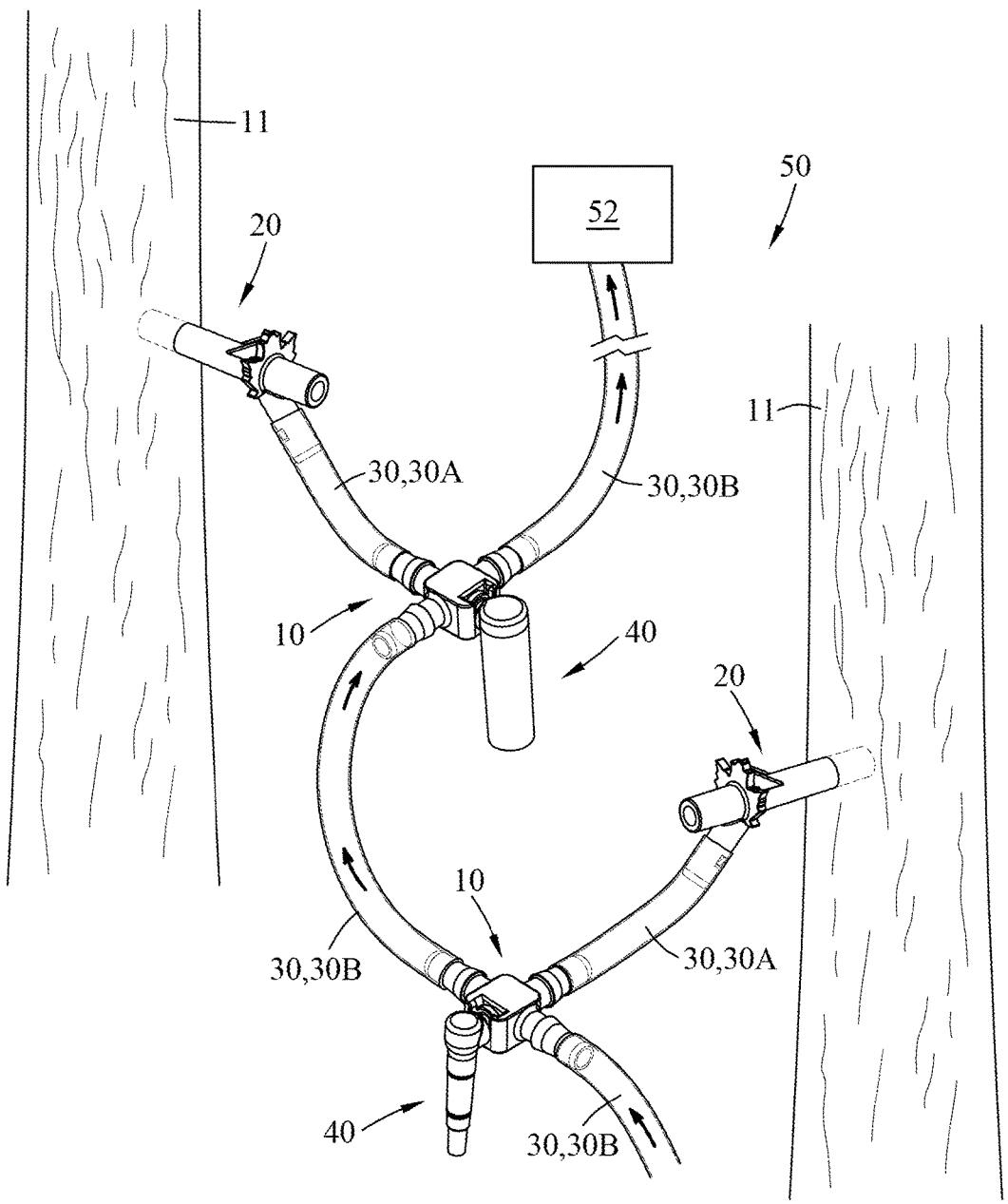
FIG. 1 is a schematic view of a tree sap line connector assembly having spouts, line connectors, sap collection lines, and sealing members, according to an embodiment of the present disclosure.

FIG. 1 illustrates a tree sap line connector assembly 50, or circuit, for collecting sap from multiple trees 11. The line connector assembly 50 collects the sap produced by each tree 11 and directs it toward a central sap-collection location 52 for further processing. The tree sap line connector assembly 50 includes a plurality of spouts 20 and a plurality of line connectors 10 which are fluidly interconnected in fluid flow communication by sap collection lines 30. As will be seen, a sealing member 40 may be provided for each line connector 10 (or each pairing of a line connector 10 and a spout 20). Each sealing member 40 engages a corresponding spout 20 to seal the spout 20.

Each spout 20 of the line connector assembly 50 is insertable into a corresponding tree 11, allowing sap to drain from the tree 11 and into the spout 20 for collection. A corresponding sap collection line 30 is engaged with the second or output end of each spout 20. More particularly, a collection line 30 extends from each spout 20 to a line connector 10. Each line connector 10 is itself connected to other line connectors 10 via the collection lines 30. The collection lines 30 direct the sap collected from the spouts 20, and transferred through the line connectors 10, to the central sap-collection location 52 along the sap flow direction indicated by the arrows. The diameter of the collection lines 30 can vary throughout the assembly 50. For example, the collection lines 30 extending from the spouts 20 to the line connectors 10 may be secondary lines 30A, and can be cylindrical plastic tubing have a diameter of 5/16". The collection lines 30 linking the line connectors 10 may be main lines 30B, and can have a larger diameter than the secondary lines 30A. It can thus be appreciated that each line connector 10 (or simply "connector 10") forms a node in the tree sap line connector assembly 50, thereby allowing sap to be conveyed over relatively long distances to the central sap-collection location 52.

Figure 2:
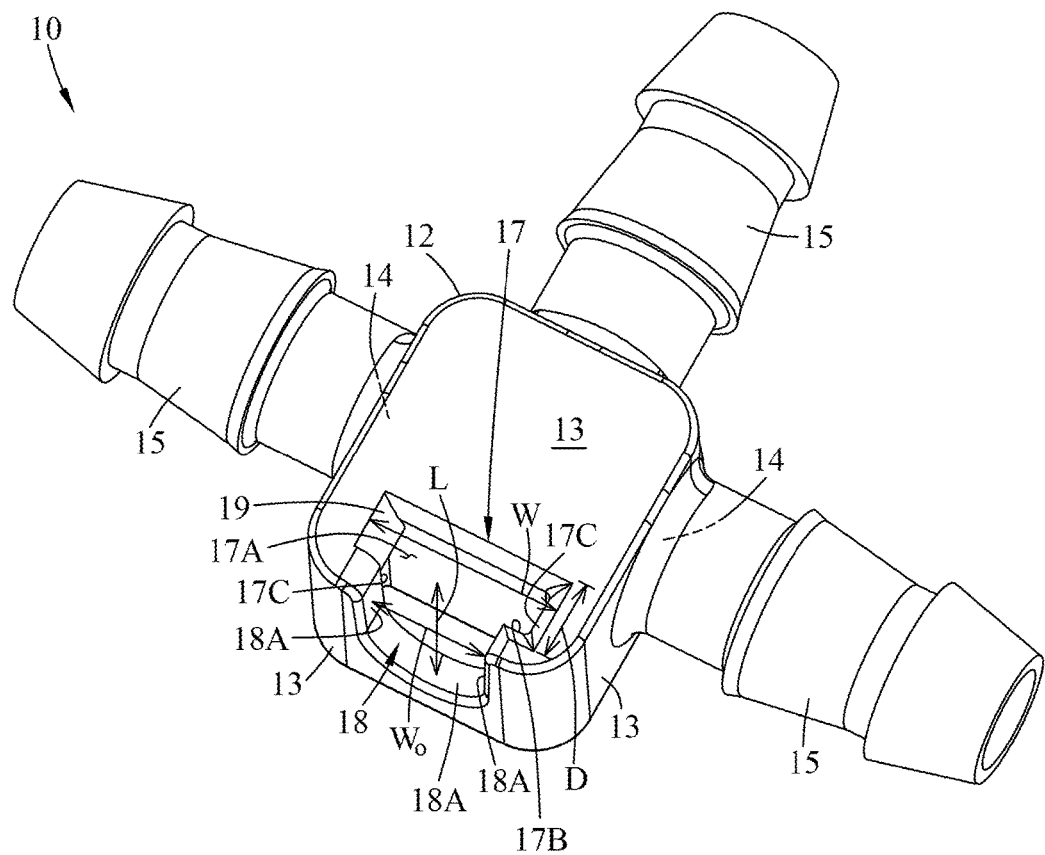
FIG. 2 is a perspective view of one of the line connectors of FIG. 1.

FIG. 2 illustrates an embodiment of the connector 10. When installed within the tree sap line connector assembly, the connector 10 receives sap from a spout or from another connector 10, and conveys the sap in the direction of the central sap-collection location. The connector 10 is thus any suitable tree sap transferring device. The connector 10 has a fluid transfer body 12 which routes the sap, and one or more features which allow a sealing member to be mounted onto the fluid transfer body 12. The connector 10 is therefore able to receive and secure a sealing member. This allows the sealing member, and the sealed spout with which it is engaged, to remain attached to the connector 10 at all times, as will be explained in more detail below.

The fluid transfer body 12 is a hollow body which is defined by interconnected walls 13. The walls 13 bound and define an inner chamber, which is the hollow interior of the fluid transfer body 12. The interconnectedness of the walls 13 defines the shape of the fluid transfer body 12, and ultimately, the shape of the connector 10. For example, if the fluid transfer body 12 has one circumferential wall 13 bounded on each side by circular walls 13, the connector 10 will have the shape of a cylinder. If, however, there are six walls 13 each perpendicularly connected to one another, the connector 10 will have the shape of a rectangular prism, or box. It will be appreciated that many possible shapes for the fluid transfer body 12, and thus for the connector 10, are within the scope of the present disclosure.

At least some of the walls 13 have an aperture 14 therein. Each aperture 14 is in fluid communication with the inner chamber of the fluid transfer body 12, meaning that each aperture 14 can receive and convey sap from/to the inner chamber. Each aperture 14 is a passage through a wall 13 through which sap can enter and exit from the inner chamber of the fluid transfer body 12. In most instances, each wall 13 has only one aperture 14 which allows the fluid transfer body 12 to receive and convey sap from/along multiple directions.

The fluid transfer body 12 also has one or more sap conduits 15. Each sap conduit 15 can either receive sap from a sap collection line mounted thereto, or convey sap from the fluid transfer body 12 to a collection line. Each sap conduit 15 is in fluid communication with the inner chamber via one of the apertures 14 in the wall 13. Each sap conduit 15 is an elongated body which extends away from the wall 13 on which the corresponding aperture 14 is located. "Extending away" means that each sap conduit 15 is coincident with the aperture 14 at a first end, and extends a distance away from the aperture 14 until a second end. In most instances, each sap conduit 15 extends along a sap conduit axis which is perpendicular to the wall 13. However, the sap conduit axis can also extend away from the corresponding wall 13 at different angles (i.e. acute or obtuse) thereto. The sap conduit axis can also be curved.

It will thus be appreciated that the interconnectedness of the walls 13, as well as the arrangement of the apertures 14 and of the sap conduits 15, will determine the shape of the fluid transfer body 12, and thus the nature of the connector 10. For example, the connector 10 shown in FIG. 2 has a fluid transfer body 12 shaped as a rectangular prism, and three sap conduits 15 extending from three corresponding apertures 14. Two of the apertures 14 and corresponding sap conduits 15 are aligned, while the third sap conduit 15 is oriented substantially perpendicularly to the other two sap conduits 15. More particularly, each of the sap conduits 15 is at a right angle to an adjacent sap conduit 15. The connector 10 in this configuration therefore forms a line "T" or tee. The connector 10 may, however, be other types of fluid transfer objects, such as, but not limited to: a union, an elbow, a cross tee, a Y-shaped fork, a tee spile, etc.

Still referring to FIG. 2, an accessory can be mounted to the fluid transfer body 12 and removed therefrom. When mounted to the fluid transfer body 12, the accessory can be secured in place for extended periods of time. The accessory described herein is a sealing member, but other types of accessories are also within the scope of the present disclosure.

The sealing member is mounted to, and secured within, a groove 17 in the fluid transfer body 12. The groove 17 is present in, and integral with, one of the walls 13 which does not have a sap conduit 15. The groove 17 may therefore be located in any wall 13 of the fluid transfer body 12 that is easily accessed. The integrality of the groove 17 with the fluid transfer body 12 can be achieved during the manufacturing of the connector 10, such as by injection molding the groove 17 and the fluid transfer body 12 together. In such a configuration, the groove 17 and the fluid transfer body 12 together form a single, monolithic object, or a one-piece construction.

The groove 17 extends into the fluid transfer body 12 from this wall 13. The groove 17 is a slot extending a depth D into one of the walls 13. The groove 17 also has a length L and a width W. The groove 17 is accessible from an exterior of the connector 10, and is shaped to receive the sealing member so that the sealing member can be mounted to, and removed from, the fluid transfer body 12 (and thus the connector 10).

In the embodiment of FIG. 2, the groove 17 has a first groove wall segment 17A spaced-apart across the void of the groove 17 from a second groove wall segment 17B. Side groove wall segments 17C extend between the first and second groove wall segments 17A, 17B on both ends thereof. The first, second, and side groove wall segments 17A, 17B, 17C circumscribe the groove 17 and give form thereto. In this embodiment, the first and second groove wall segments 17A, 17B are parallel to one another, as well as being parallel to the wall 13 in which the groove 17 is located. The second groove wall segment 17B has an access opening 18 which extends along at least part of the length L of the groove 17. The access opening 18 is circumscribed by multiple interconnected opening wall segments 18A. In the embodiment shown, the opening wall segments 18A are substantially planar objects which define an access opening 18 having a rectangular prism shape. The opening wall segments 18A can define other shapes for the access opening 18, and can be non-planar. For example, and as shown, the groove 17 is rounded, and is open at both ends. More particularly, one or more of the opening wall segments 18A which circumscribe the access opening 18 in the second groove wall segment 17B is curved. Such a groove 17 is shaped and sized to receive a corresponding connector piece from the sealing member which is also rounded. Indeed, the connector piece may be circular. Such a groove 17 is an open-ended, closed perimeter groove 17.

The width of the access opening $W_o$ can be less than the width W of the groove 17, and thus less than the width of the second groove wall segment 17B. Such a groove 17 is able to receive the sealing member therein, and retain at least part of the sealing member in the groove 17. This helps to better secure the sealing member to the line connector 10.

The length L of the groove 17 along the wall 13 can vary. For example, in the embodiment shown, the groove 17 extends the entire length L of the wall 13. The groove 17 is thus open at both of its ends. In an alternative embodiment, the groove 17 does not extend along the entire length L of the wall 13. The groove 17 is thus open at only one of its ends, where the "bottom" of the groove 17 defines a surface against which a complementary part of the sealing member can rest and be supported. This configuration of the groove 17 also allows the complementary part of the sealing member to enter the groove 17 on one of its ends, while preventing it from exiting via the other end of the groove 17. Such a groove 17 is an open-top, or closed perimeter groove 17.

The groove 17 in the embodiment of FIG. 2 has a projection 19. The projection 19 may be located in the groove 17 to further secure the sealing member within the groove 17. In the embodiment shown, the projections 19 is a bump which extends away from one of the side groove wall segments 17C and into the groove 17 toward the other side groove wall segment 17C. As will be explained in greater detail below, the projection 19 is received in a corresponding recess or notch in a mating part of the sealing member. The projection 19 may also include a magnet, and engage with a magnet on the sealing member having an opposite polarity. Other configurations for the projection 19 are also within the scope of the present disclosure.

Figure 3:
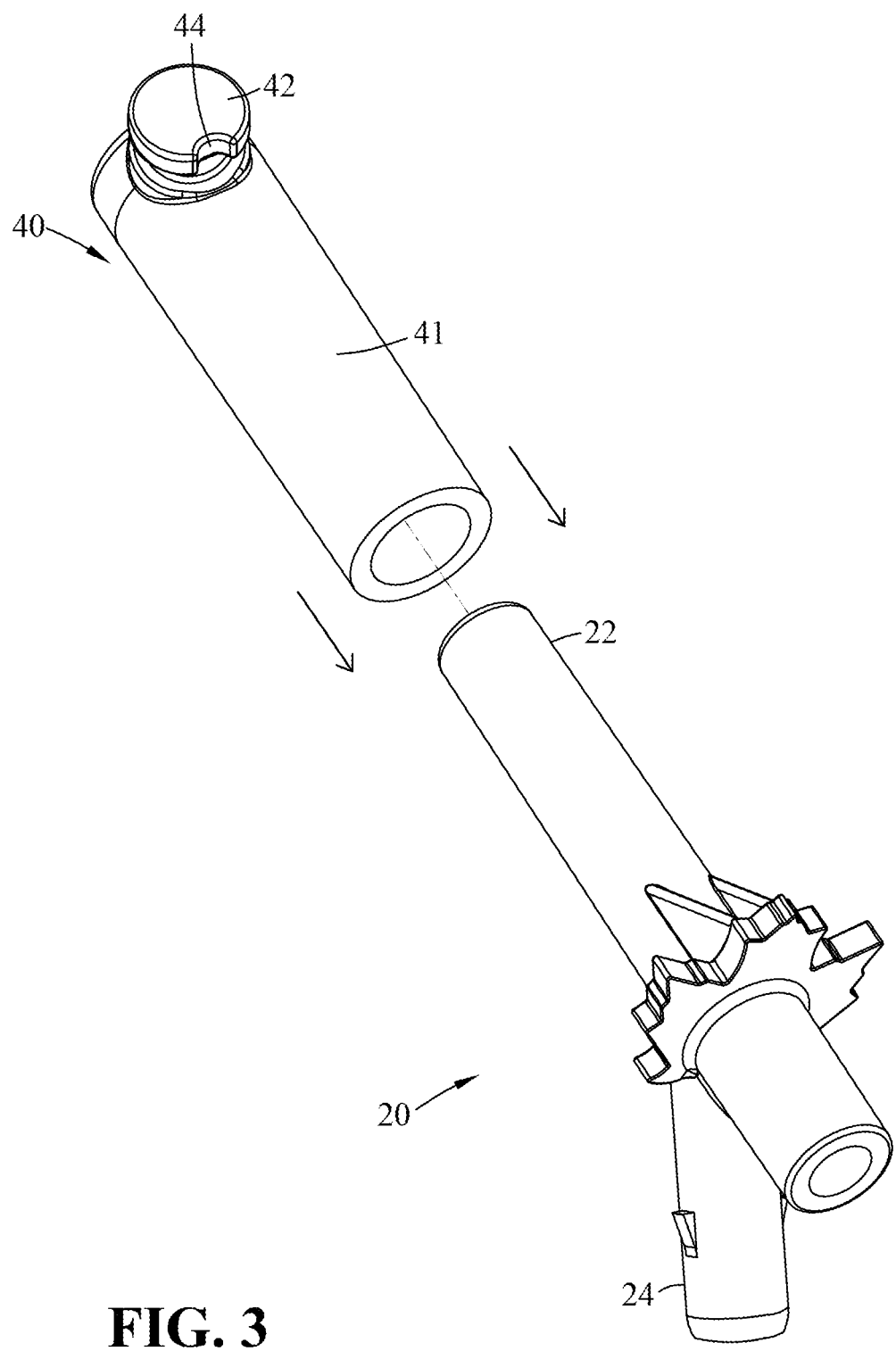
FIG. 3 is an exploded view of one of the sealing members and one of the spouts of FIG. 1.

The functionality and purpose of the sealing member 40 are now discussed, with reference to FIG. 3. The sealing member 40 seals the spout 20 so as to prevent the ingress of dirt, ice, fluid, insects, or other debris into the spout 20, when the spout 20 is removed from the tree. By sealing the spout 20, the sealing member 40 also allows prevents the ingress of the surrounding air, allowing a vacuum to be created in the collection lines. In so doing, the sealing member 40 helps to keep the spout 20 clean when it is removed from the tree, such as during the off season, when the spout 20 is exposed to the elements. The spout 20 in this embodiment is a hollow body which has a first end 22 which can be inserted into a tree, and a second end 24 through which sap is conveyed to a collection line mounted to the second end 24. The terms "first" and "second" refer more generally to the tree-insertion end and to the sap collection end, respectively, and do not limit the spout 20 to having a particular configuration, or to only having two ends.

After the spout 20 has been cleaned, or if the operator wishes to seal the spout 20 for any reason, the operator can take the sealing member 40 and engage it with at least the first end 22 of the spout 20 so as to cover, plug, or block the first end 22 and prevent the ingress of debris or other contaminants. The sealing member 40 shown in FIG. 3 has a cap sealing body 41. The cap sealing body 41 is a hollow extrusion that is sized and shaped to be matingly received onto at least the first end 22 of the spout 20 by being slid over the outer surface of the spout 20 along the direction indicated by the arrows.

Once the cap sealing body 41 is in place, it is prevented from easily coming off the spout 20, generally by a suitable frictional engagement with the spout 20. The spout 20 is now sealed, and can be displaced with the sealing member 40. A connector piece 42 of the sealing member 40 can be engaged with the groove of the line connector so that the sealing member 40 and the sealed spout 20 are securely mounted to, and removable from, the line connector. It will thus be appreciated that the sealing member 40, its connector piece 42, and the groove of the line connector can take many different forms, some of which are now discussed.

Figure 4A:
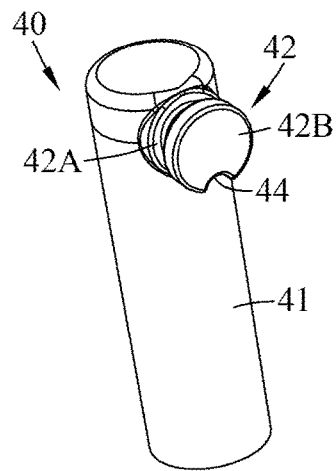
FIG. 4A is a perspective view of the sealing member of FIG. 3.
Figure 4B:
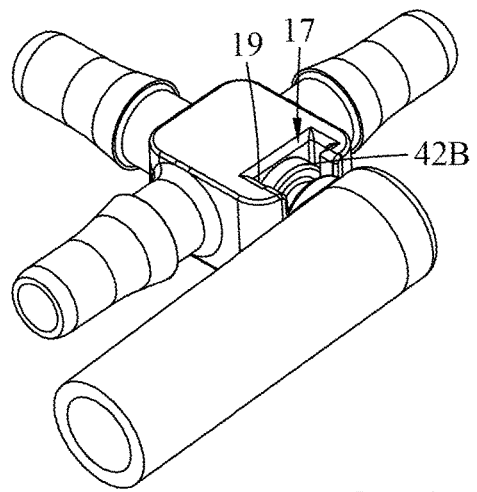
FIG. 4B is a perspective view of the sealing member of FIG. 4A mounted to the line connector of FIG. 2 in an intermediate position.
Figure 4C:
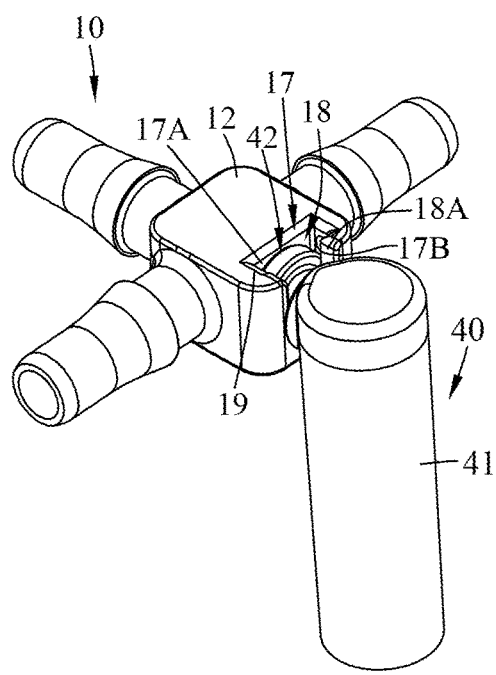
FIG. 4C is a perspective view of the sealing member of FIG. 4A mounted to the line connector of FIG. 2 in a final position

Referring to FIGS. 4A to 4C, the connector piece 42 of the sealing member 40 is a protrusion which extends from the outer surface of the cap sealing body 41. The connector piece 42 is, in this embodiment, a circumferential body which is shaped and sized to be complementary to the groove 17 of the connector 10. The term "complementary" means that the shapes of the connector piece 42 and the groove 17 are similar, but not necessarily identical, such that the connector piece 42 can be received in the groove 17. In operation, the connector piece 42 is slid into an open end of the groove 17. The connector piece 42, and thus the sealing member 40 and sealed spout, are then secured against the fluid transfer body 12 of the connector 10.

In the embodiment shown, the connector piece 42 has a bridge member 42A extending away from the cap sealing body 41. A proximal end of the bridge member 42A is connected to the cap sealing body 41 and extends away therefrom to a distal end of the bridge member 42A. The distal end of the bridge member 42A is connected to a tongue member 42B, which can be inserted into, and removed from, the groove 17. The bridge member 42A spaces the cap sealing body 41 away from the fluid transfer body 12, thereby facilitating the removable insertion of the connector piece 42 into the groove 17. In the embodiment shown, the bridge and tongue members 42A,42B are slid into the groove 17 from one of its ends. The tongue member 42B engages the first and second groove wall segments 17A, 17B, while the bridge member 42A engages the opening wall segments 18A of the access opening 18.

In the embodiment shown, the tongue member 42B can have a notch 44 to receive the corresponding projection 19 of the groove 17 discussed above. The engagement of the projection 19 with the notch 44 can form a friction or "snap" fit between the groove 17 and the connector piece 42, further securing the sealing member 40 to the line connector 10.

Referring to FIGS. 4B and 4C, the projection 19 from the side groove wall segment engages the notch 44 in the tongue member 42B when the tongue member 42B is inserted into the groove 17. The projection 19 may extend outwardly from the side groove wall segment an extent such that it blocks the tongue member 42B from entering the groove 17 unless the notch 44 is aligned with the projection 19. Aligning the notch 44 with the projection 19 allows the tongue member 42B to enter the groove 17, as shown in FIG. 4B. Once the tongue member 42B has passed the projection 19, it can be rotated or displaced relative to the side groove wall segment along direction R towards the position shown in FIG. 4C. The tongue member 42B is now secured within the groove 17, and cannot be removed therefrom unless the notch 44 is aligned with the projection 19. This configuration of the notch 44 and projection 19 helps to secure the connector piece 42, and thus the sealing member 40, in the groove 17 regardless of the orientation of the connector 10. The connector 10 can therefore be positioned at any position desired by the operator to facilitate the collection and conveyance of sap.

Figure 5A:
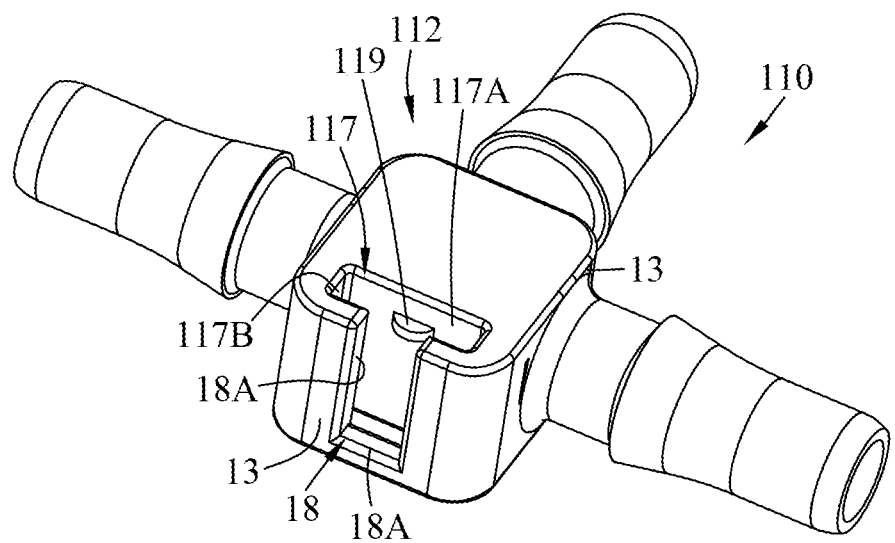
FIG. 5A is a perspective view of a line connector, according to another embodiment of the present disclosure.
Figure 5B:
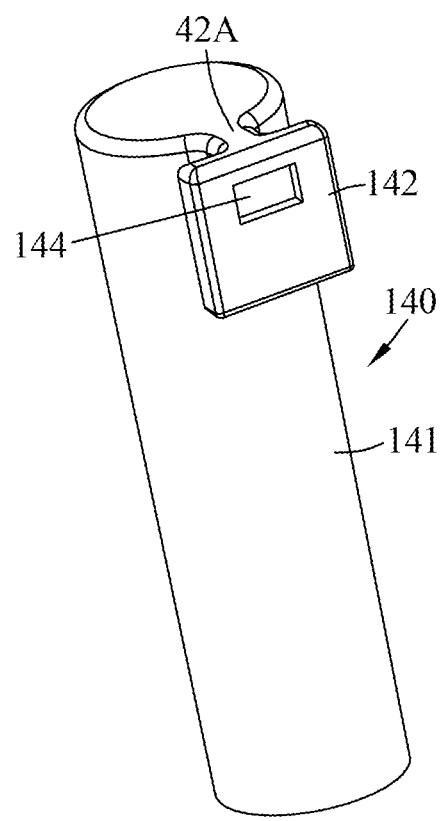
FIG. 5B is a perspective view of a sealing member according to yet another embodiment of the present disclosure, mountable to the line connector of FIG. 5A.

Referring to FIGS. 5A and 5B, a sealing member 140 with a cap sealing body 141 is shown. The cap sealing body 41 is a hollow extrusion that is sized and shaped to be matingly received onto at least the first end of the spout by being slid over the outer surface of the spout along the direction indicated by the arrows. This seals, or "caps", the first end of the spout and prevents the ingress of contaminants. The connector piece 142 is a rectangular prism which is shaped and sized to be complementary to the groove 117.

In the embodiment shown, the groove 117 has a first groove segment which extends into the fluid transfer body 112 perpendicularly to the wall 13. A second groove segment is within the corpus of the fluid transfer body 112, and intersects the first groove segment perpendicularly. The intersecting first and second groove segments define a cross, or "T" shaped slot or groove 117. If necessary, the fluid transfer body 112 can be made thicker along the wall 13 having the groove 117 so that the groove 117 does not intersect the inner chamber of the fluid transfer body 12. In the embodiment shown, the projection 119 extends away from the first groove wall segment 117A. It will be appreciated that the projection 19 may instead extend away from the second groove wall segment 117B. For additional retention, and only if desired, the connector piece 142 can have a recess 144 to receive the corresponding projection 119 of the groove 117.

In operation, the connector piece 142 is slid into an open end of the groove 117 until the projection 119 is received in the recess 144. The connector piece 142, and thus the sealing member 140 and sealed spout, are then secured against the fluid transfer body 112 of the connector 110.

Figure 6A:
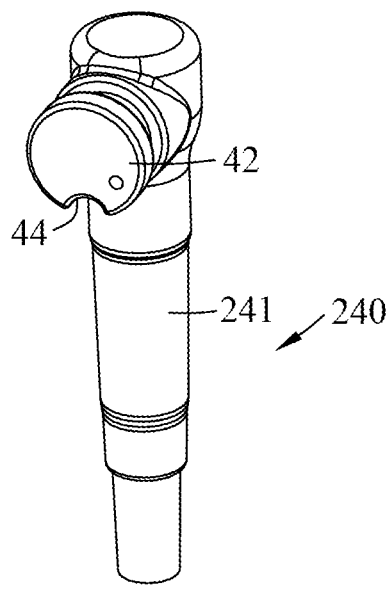
FIG. 6A is a perspective view of another one of the sealing members of FIG. 1.
Figure 6B:
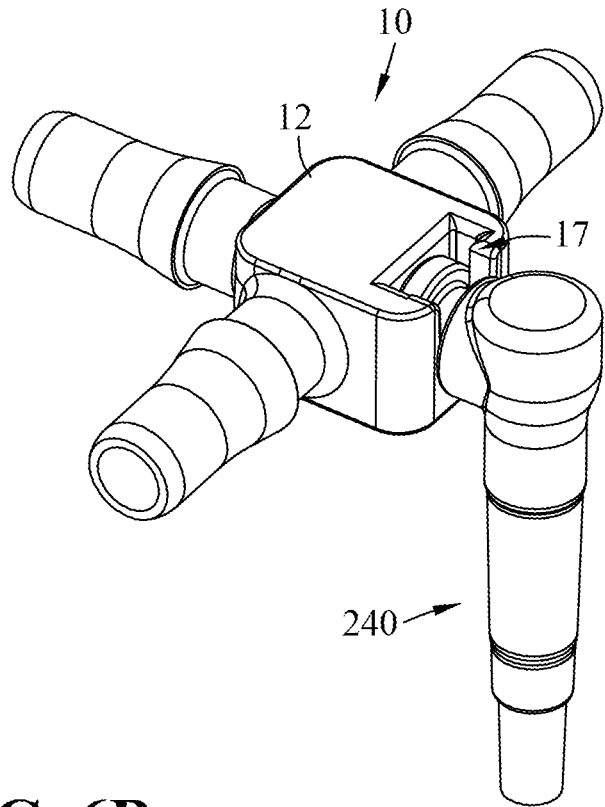
FIG. 6B is a perspective view of the sealing member of FIG. 6A mounted to the line connector of FIG. 2.

Referring to FIGS. 6A to 6B, a sealing member 240 with a plug or pin sealing body 241 is shown. The plug sealing body 241 is an elongated body having a cross-sectional area that narrows from one end to the other. The plug sealing body 241 engages the first end of the spout by being inserted into the hollow interior of the spout. This seals, or "plugs", the first end of the spout and prevents the ingress of contaminants. The connector piece 42 of the sealing member 240 is similar to the one of FIGS. 4A and 4B, and is a protrusion which extends from the outer surface of the plug sealing body 241. In operation, the connector piece 42 is slid into an open end of the groove 17. The connector piece 42, and thus the sealing member 240 and sealed spout, are then secured against the fluid transfer body 12 of the connector 10. For additional retention, and only if desired, the connector piece 42 can have a notch 44 to receive the corresponding projection of the groove 17.

Figure 7A:
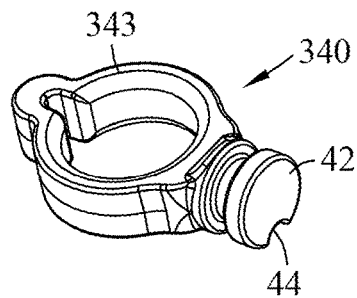
FIG. 7A is a perspective view of a loop of a sealing member, according to another embodiment of the present disclosure.
Figure 7B:
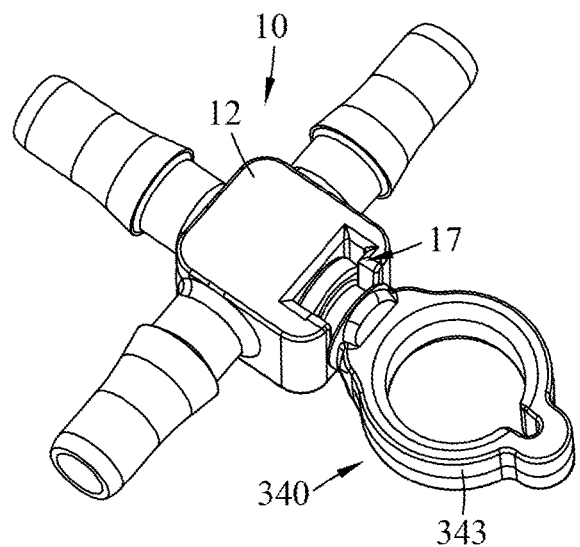
FIG. 7B is a perspective view of the loop of FIG. 7A mounted to the line connector of FIG. 2.
Figure 7C:
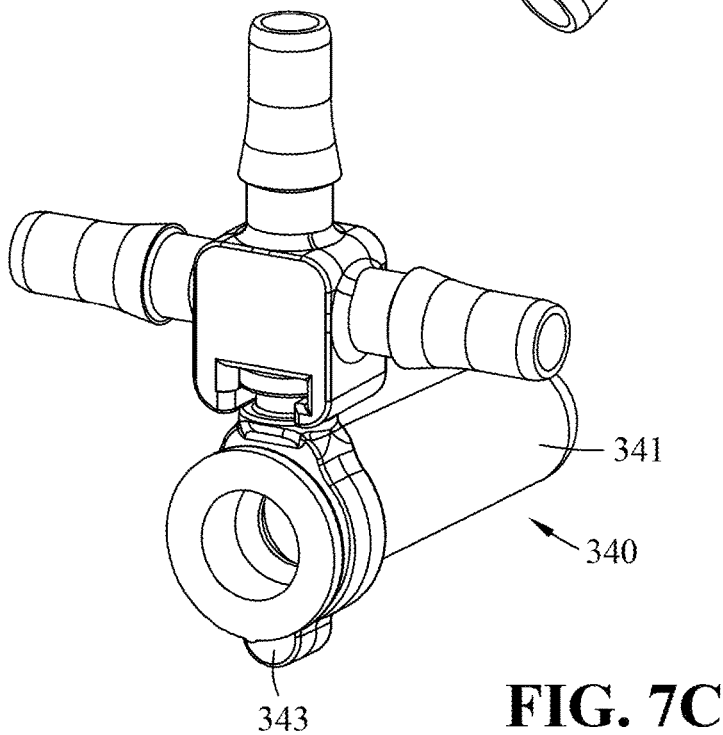
FIG. 7C is a perspective view of the loop of FIG. 7A with a sealing body, mounted to the line connector of FIG. 2.

Referring to FIGS. 7A to 7C, a loop and cap sealing member 340 is shown. The loop and cap sealing member 340 is a sealing member having two parts: a cap sealing body 341 which caps the spout thereby sealing it, and a loop 343 which is mounted to, and removable from, the fluid transfer body 12. The cap sealing body 341 can be securely mounted to, and removed from, the loop 343, as shown in FIG. 7C. The cap sealing body 341 engages the first end of the spout by being slid over the outer surface of the first end. This seals the first end of the spout and prevents the ingress of contaminants. The connector piece 42 of the loop 343 is similar to the one of FIGS. 4A and 4B, and is a protrusion which extends from the outer surface of the loop 343. In operation, the connector piece 42 is slid into an open end of the groove 17. The connector piece 42, and thus the loop 343 and the cap sealing body 341, are then secured against the fluid transfer body 12 of the connector 10. For additional retention, and only if desired, the connector piece 42 can have a notch 44 to receive the corresponding projection of the groove 17.

Figure 8:
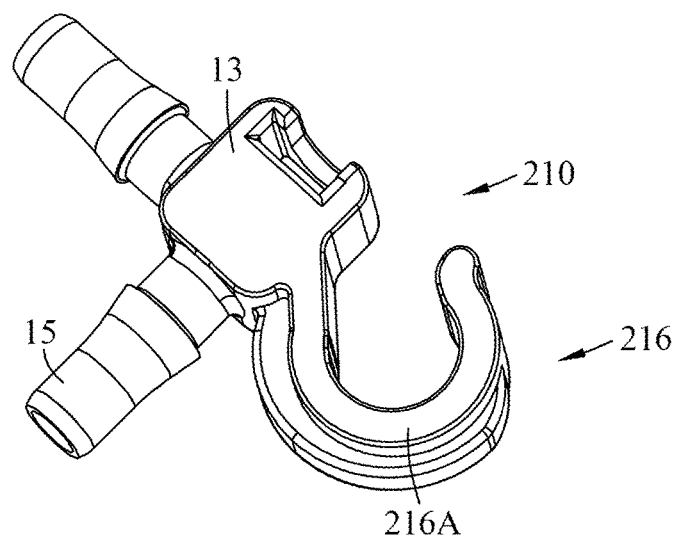
FIG. 8 is a perspective view of a line connector, according to yet another embodiment of the present disclosure.

FIG. 8 shows another embodiment of the tree sap line connector 210. The connector 210 is similar to the ones described above, except that there are only two sap conduits 15. One of the exterior walls 13 has an attachment member 216. In this embodiment, the attachment member 216 includes a hook 216A, but the attachment member 216 can take other forms as well. Various accessories, including but not limited to sealing members, can be attached to, or secured by the hook 216a.

Figure 9:
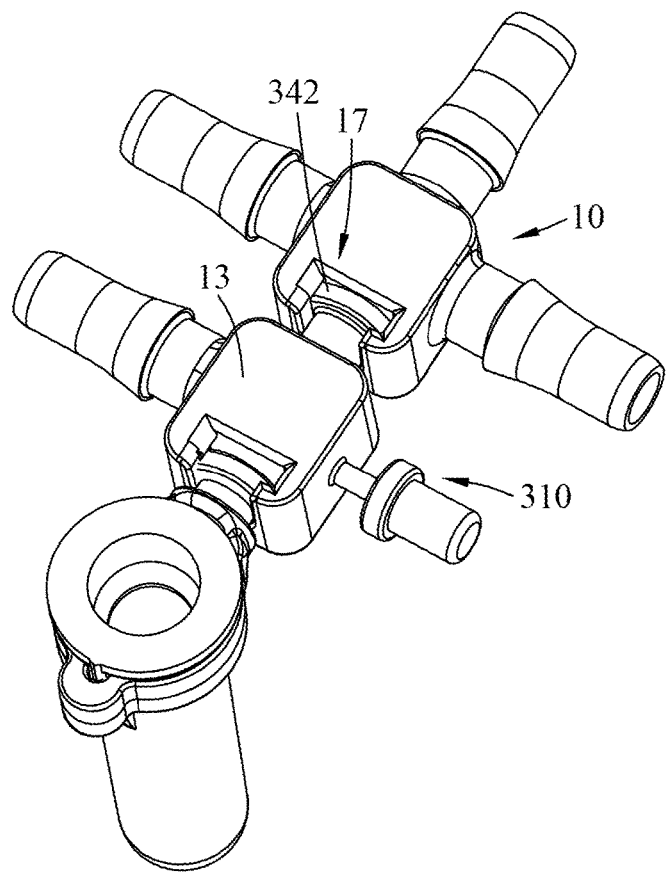
FIG. 9 is a perspective view of multiple line connectors and a sealing member, according to yet another embodiment of the present disclosure.

FIG. 9 shows another embodiment of the line connector 310. One of the connectors 10 shown is similar to the one shown in FIG. 1. The other connector 310 is similar to the ones described above, except that there are only two sap conduits. In place of the third sap conduit, one of the exterior walls 13 of the connector 310 has a connector piece 342, similar to the ones describe above for the sealing members, for engaging the groove 17 of the connector 10. The connector piece 342 may be a hollow conduit so that sap can be conveyed between the connectors 10,310.

The cleaning of the tree sap collection system 50 will now be described with reference to FIG. 1. At the end of the sap-collecting season, or whenever desired during the sap-collecting season, the spouts 20 are removed from the trees 11 to be cleaned and stored. An operator will remove each spout 20 from the tree 11, and place the first end of the spout 20 into a container of cleaning solution. A central vacuum will suck the cleaning fluid through the spout 20, through its connector 10, and through some collection lines 30, thereby cleaning that part of the tree sap line collector assembly 50.

Once the spout 20 is cleaned, it needs to be sealed so that it remains clean. The operator is free to use the sealing member 40,140,240,340 of her/his choice to seal the spout 20 as described above. The sealed spout 20 and sealing member 40,140,240,340 will then be mounted to the connector 10 via the groove, as described above. The spout 20 is therefore sealed and stored with the connector 10. Part of the sap collection lines 30, such as the secondary line 30A linking the sealed spout 20 to the connector 10, is also mounted to the connector 10 via the spout 20 when the sealing member 40,140,240,340 is mounted to the connector. This is repeated for as many spouts 20 as is desired. When the sap-collecting season begins anew in the spring, the spout 20 can be easily located because it is attached to the connector 10. The spout 20 will also have remained clean. The operator can therefore simply remove the sealing member 40,140,240,340 and insert the spout 20 into the tree 11.

It can thus be appreciated that, at the end of the sap-collecting season, the connector 10,110,310 disclosed herein allows the sealing member 40, the sealed spout 20, and the collection line 30 associated with the spout 20 to remain together. Therefore, the objects (e.g. the sealing member 40, the sealed spout 20, and the collection line 30) required to collect sap from a given tree 11 are stored in proximity to that tree 11 by being removably mounted to the connector 10,110,310. This helps the operator quickly locate these objects when sap collecting begins anew, which reduces the amount of time required to harvest the tree 11 in question. When hundreds or thousands of trees are being harvested, these incremental reductions in time cumulatively provide important productivity gains.

While sap is being collected during the sap-collecting season, the sealing member 40 can be mounted to the connector 10,110,310 and remain attached thereto. The sealing member 40 is thus close at hand and readily available when it is required to seal the spout 20.

It can thus be appreciated that the connector 10,110,310 disclosed herein may reduce the time required to clean and store a large number of spouts in a sap collection operation. This can contribute to improving the overall productivity of the operation by reducing the time required to clean, cap, and store spouts for the off season.

The complementarity of the groove 17 of each connector 10,110,310 and the connector piece 42 of each sealing member 40 allows many different types of sealing members 40,140,240,340 to be used for a single connector 10,110, 310. This is an improvement over conventional line tees, in which the sealing member is a typically integral component of the line tee. An operator with such a conventional line tee is thus limited to using one specific type of sealing member. If the operator wishes to use a different type of sealing member, she/he must change the entire line tee which involves a considerable amount of work.

Furthermore, the groove 17 in the connector 10,110,310 reduces the weight of the connector 10,110,310. For large production runs of the connectors 10,110,310, such as thousands or tens of thousands of units, there is a significant reduction in the material cost required to produce one connector 10,110,310. This compares favourably with some conventional line tees, which have a plug or cap extending therefrom for sealing the sealing member. The plug or cap increases the unit weight of the line tee, and thus its unit material costs.

Although shown and described herein as having a groove 17, the connector 10,110,310 can also have other attachment devices for removably mounting the sealing member 40 thereto. Such attachment devices include, but are not limited to, a button, a hook-and-loop fastener strip, a male/female connector, or any other object which can be fixedly attached to an outer surface of the fluid transfer body 12, and which can receive and secure a complementary connector piece from the sealing member. Similarly, each connector 10 can have one or more such attachment devices, as required.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A tree sap line connector assembly, comprising:
   at least one line connector comprising a fluid transfer body having interconnected walls defining a hollow inner chamber being in fluid communication with a plurality of sap conduits each extending from one of the walls, each sap conduit being engageable with a sap collection line to convey sap to and from the inner chamber, at least one of the walls being free of a sap conduit and having a groove therein, the groove extending a depth into said wall and being accessible from an exterior of the fluid transfer body;
   at least one sealing member having a sealing body to seal a corresponding spout adapted to receive sap from a tree, the at least one sealing member having a connector piece being shaped complementary to the groove in the fluid transfer body, the connector piece being removably insertable into the groove to removably mount the at least one sealing member to the at least one line connector; and
   the spout extending between a first end adapted to be inserted into the tree and a second end, the sealing body of the at least one sealing member being engageable with the first end of the spout to seal the spout, the at least one sealing member, and the spout sealed thereby, being removably mounted to the at least one line connector upon the connector piece being removably inserted into the groove.

2. The assembly of claim 1, wherein the groove has a first groove wall segment spaced-apart from a second groove wall segment, the first and second groove wall segments being parallel to said wall having the groove, the groove having side groove wall segments extending between the first and second groove wall segments.

3. The assembly of claim 2, wherein the connector piece has a bridge member extending away from the sealing body, a distal end of the bridge member being connected to a tongue member, the tongue member being insertable into the groove between the first and second groove wall segments.

4. The assembly of claim 3, wherein one of the side groove wall segments has a projection extending away therefrom toward the other side groove wall segment, and the tongue member has a notch.

5. The assembly of claim 4, wherein the projection of said side groove wall segment engages the notch in the tongue member upon insertion of the tongue member into the groove, a displacement of the tongue member relative to said side groove wall segment disengaging the projection from the notch.

6. A tree sap line connector assembly, comprising:
   at least one line connector comprising a fluid transfer body having interconnected walls defining a hollow inner chamber being in fluid communication with a plurality of sap conduits each extending from one of the walls, each sap conduit being engageable with a sap collection line to convey sap to and from the inner chamber, at least one of the walls being free of a sap conduit and having a groove therein, the groove extending a depth into said wall and being accessible from an exterior of the fluid transfer body;

at least one sealing member having a sealing body to seal a corresponding spout adapted to receive sap from a tree, the at least one sealing member having a connector piece being shaped complementary to the groove in the fluid transfer body, the connector piece being removably insertable into the groove to removably mount the at least one sealing member to the at least one line connector; and the spout extending between a first end adapted to be inserted into the tree and a second end, the sealing body of the at least one sealing member being engageable with the first end of the spout to seal the spout, the sap collection line extending between the second end of the spout and one of the sap conduits, the at least one sealing member, the spout sealed thereby, and the sap collection line being removably mounted to the at least one line connector upon the connector piece being removably inserted into the groove.

7. The assembly of claim 6, wherein the groove has a first groove wall segment spaced-apart from a second groove wall segment, the first and second groove wall segments being parallel to said wall having the groove, the groove having side groove wall segments extending between the first and second groove wall segments.

8. The assembly of claim 7, wherein the connector piece has a bridge member extending away from the sealing body, a distal end of the bridge member being connected to a tongue member, the tongue member being insertable into the groove between the first and second groove wall segments.

9. The assembly of claim 8, wherein one of the side groove wall segments has a projection extending away therefrom toward the other side groove wall segment, and the tongue member has a notch.

10. The assembly of claim 9, wherein the projection of said side groove wall segment engages the notch in the tongue member upon insertion of the tongue member into the groove, a displacement of the tongue member relative to said side groove wall segment disengaging the projection from the notch.

* * * * *